(12) United States Patent
Sorokin

(10) Patent No.: US 9,948,776 B2
(45) Date of Patent: Apr. 17, 2018

(54) ENRICHED PRESENCE STATUS

(71) Applicant: Alcatel Lucent, Boulogne Billancourt (FR)

(72) Inventor: Roman Sorokin, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/432,769

(22) PCT Filed: Sep. 17, 2013

(86) PCT No.: PCT/EP2013/069306
§ 371 (c)(1),
(2) Date: Apr. 1, 2015

(87) PCT Pub. No.: WO2014/056685
PCT Pub. Date: Apr. 17, 2014

(65) Prior Publication Data
US 2015/0249743 A1     Sep. 3, 2015

(30) Foreign Application Priority Data

Oct. 8, 2012   (EP) .................................... 12306224

(51) Int. Cl.
  *H04M 3/42* (2006.01)
  *H04M 3/436* (2006.01)
  *H04L 29/08* (2006.01)
(52) U.S. Cl.
  CPC .......... *H04M 3/4365* (2013.01); *H04L 67/24* (2013.01); *H04L 67/306* (2013.01)
(58) Field of Classification Search
  CPC .... H04M 3/436; H04M 3/42; H04M 3/42059; H04M 3/54; H04M 3/42153; H04M 3/58
  (Continued)

(56) References Cited

U.S. PATENT DOCUMENTS

| 7,035,923 B1 | 4/2006 | Yoakum et al. |
| 7,969,993 B2 | 6/2011 | Shimamura et al. |

(Continued)

FOREIGN PATENT DOCUMENTS

| CN | 1961565 A | 5/2007 |
| CN | 101262522 A | 9/2008 |

(Continued)

OTHER PUBLICATIONS

International Search Report for PCT/EP2013/069306 dated Nov. 18, 2013.

*Primary Examiner* — Rasha Al Aubaidi
(74) *Attorney, Agent, or Firm* — Fay Sharpe, LLP

(57) ABSTRACT

For enriching presence statuses of users in a contact list with call routing rules associated with said users, the presence statuses indicating an availability of said users, called contact users, for communication and being delivered by a presence server (PS) to an application (UCA) implemented in a communication device (CD) owned by a user, called application user, the presence server: sends a request to a call server (CS) managing call routing rules of said contact users, the request containing identifiers (IdCU) of said contact users, receives a response from the call server, the response containing routing statuses (RS) of said contact users, the call server having determined call routing rules (RR) stored respectively in correspondence with the identifiers (IdCU) and having interpreted the call routing rules (RR) to create a routing status for each contact user, and sends a message to the communication device (CD), the message containing the routing status for each contact user, in order that the application (UCA) displays the routing status of contact users.

6 Claims, 3 Drawing Sheets

(58) Field of Classification Search
USPC .............. 379/201.01, 211.01–211.04, 212.01
See application file for complete search history.

(56) References Cited

U.S. PATENT DOCUMENTS

| | | |
|---|---|---|
| 9,282,156 B2 | 3/2016 | Holley et al. |
| 2005/0216848 A1* | 9/2005 | Thompson ............ G06F 3/0481 715/753 |
| 2007/0172042 A1* | 7/2007 | Winikoff ............... H04M 3/436 379/142.05 |
| 2007/0172402 A1 | 7/2007 | Palo et al. |
| 2008/0005119 A1 | 1/2008 | Fernandez et al. |
| 2008/0212762 A1 | 9/2008 | Gray et al. |
| 2010/0099418 A1 | 4/2010 | Holley et al. |
| 2011/0295957 A1 | 12/2011 | Ananthanarayanan |

FOREIGN PATENT DOCUMENTS

| | | |
|---|---|---|
| CN | 101998361 A | 3/2011 |
| CN | 102340759 A | 2/2012 |
| JP | 2005-190287 A | 7/2005 |
| JP | 2007-150422 A | 6/2007 |
| JP | 2012-090161 | 5/2012 |
| KR | 2009-0017629 | 2/2009 |
| KR | 2010-0044704 | 4/2010 |
| WO | WO 99/34628 A1 | 7/1999 |
| WO | WO 2008/073006 A1 | 6/2008 |

\* cited by examiner

US 9,948,776 B2

ENRICHED PRESENCE STATUS

FIELD OF THE INVENTION

The present invention relates generally to the art of unified communication and more especially to a system dealing with routing state and presence state of users.

BACKGROUND

Let's imagine that user A is going to attend a meeting. For this period he configures his office phone to forward all incoming calls to user B. In ten minutes after that user C calls user A. As the "Immediate Forward" routing rule is set as active then user C is forwarded to user B. But user C may not want to talk to user B and he would prefer to know the result of routing of his call before he actually makes the call. It would allow him to decide whether to make a call now and be forwarded to another user or to wait until user A returns from the meeting and will be able to answer the call himself.

The same problem exists with other types of call routing: forward to Voice Mail, present call to home phone of the user if he works at home and so on. In all these cases it would be useful for the caller to know how the call will be routed by the system in order to take appropriate decisions.

There is a need to automatically detect the routing policy of a user to be called before the call establishment.

Accordingly, a new and/or improved system and/or method is disclosed which addresses the above-referenced desire(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for enriching presence statuses of users in a contact list with call routing rules associated with said users, the presence statuses indicating an availability of said users, called contact users, for communication and being delivered by a presence server to an application implemented in a communication device owned by a user, called application user, the method comprising the following steps in the presence server:

sending a request to a call server managing call routing rules of said contact users, the request containing identifiers of said contact users, receiving a response from the call server, the response containing routing statuses of said contact users, the call server having determined call routing rules stored respectively in correspondence with the identifiers and having interpreted the call routing rules to create a routing status for each contact user, sending a message to the communication device, the message containing the routing status for each contact user, in order that the application displays the routing status of contact users.

The invention advantageously provides the possibility to a caller, like said application user, to know how the call will be routed by call routing rules of the callee, like said contact users. It allows the caller to adjust its behavior accordingly, for example to call and be forwarded to Voice Mail or to wait until the callee is able to take the call.

In an embodiment, the method further comprises the following steps:

subscribing to events that are to be provided by the call server and that are associated with the identifiers of the contact users, when an event related to a change in the call routing rules of at least one contact user occurs, receiving a notification from the call server, sending an update request related to said event to the call server, receiving an update response from the call server, the update response containing the routing status of the contact user associated with the identifier of the contact user sending an update message to the communication device, the update message containing the routing statuses of the contact user associated with the identifier of the contact user.

In an embodiment, the notification and the update request contain the identifier of said contact user.

In an embodiment, the notification and the update request contain an identifier of said event.

A further object of the invention is a presence server for enriching presence statuses of users in a contact list with call routing rules associated with said users, the presence statuses indicating an availability of said users, called contact users, for communication and being delivered by the presence server to an application implemented in a communication device owned by a user, called application user, the presence server comprising:

an interface for sending a request to a call server managing call routing rules of said contact users, the request containing identifiers of said contact users, an interface for receiving a response from the call server, the response containing routing statuses of said contact users, the call server having determined call routing rules stored respectively in correspondence with the identifiers and having interpreted the call routing rules to create a routing status for each contact user, an interface for sending a message to the communication device, the message containing the routing status for each contact user, in order that the application displays the routing status of contact users.

The invention relates further to a computer program adapted to be executed in a presence server for enriching presence statuses of users in a contact list with call routing rules associated with said users, said program including instructions which, when the program is executed in said server, execute the steps of the method of the invention.

BRIEF DESCRIPTION OF THE FIGURE

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
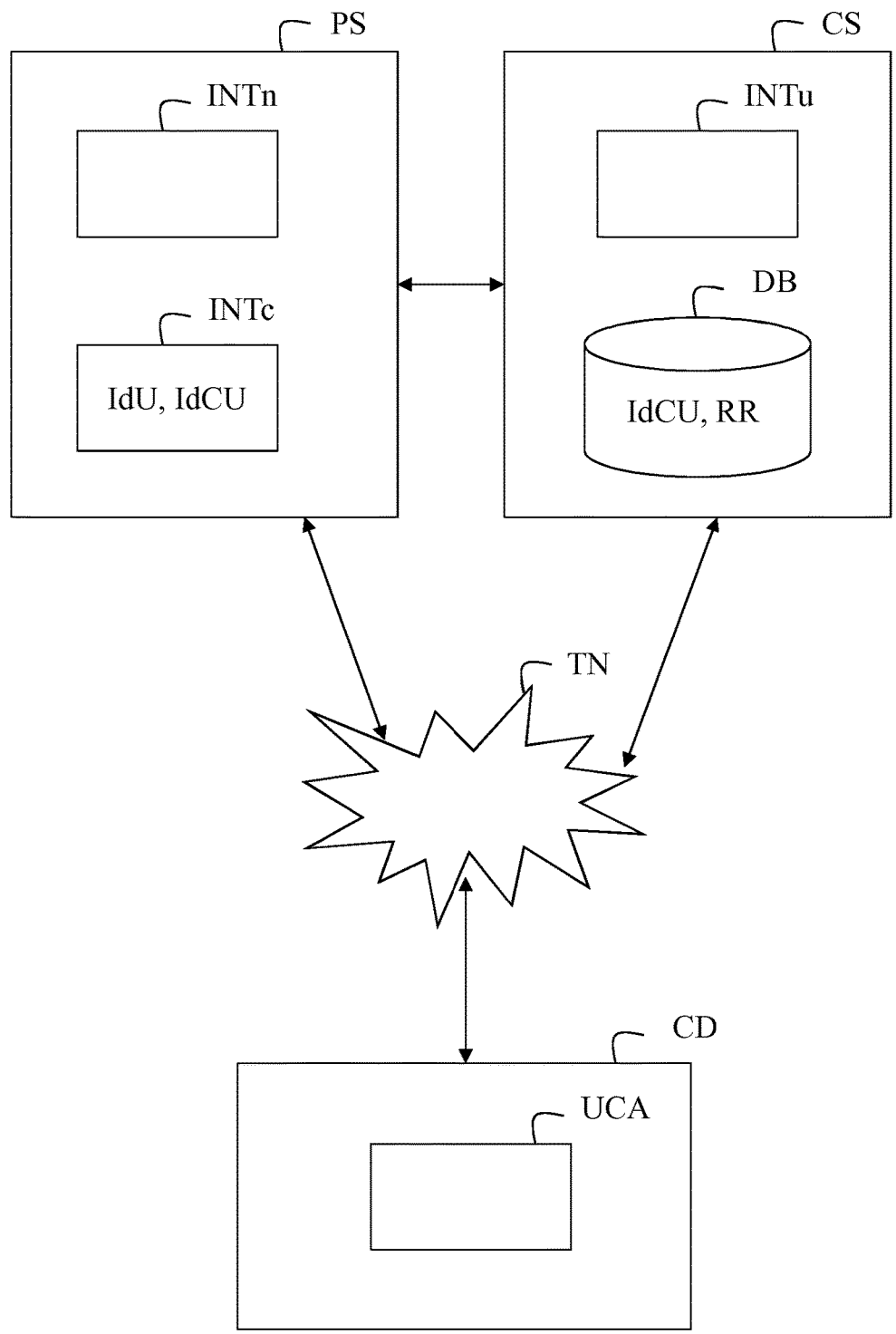
FIG. 1 is a schematic block-diagram of a communication system according to an embodiment of the invention.

Referring to FIG. 1, a communication system comprises a presence server PS, a call server CS, a communication device CD, which are able to communicate between them through a telecommunication network TN.

The telecommunication network TN may be a wired or wireless network, or a combination of wired and wireless networks.

The telecommunication network TN can be a packet network, for example, an IP ("Internet Protocol") high-speed network such as the Internet or an intranet, or even a company-specific private network.

The telecommunication network TN can be either a public or private network (in enterprise or at home).

Each communication device can be a mobile terminal or a fixed terminal.

As mobile terminal, the communication device can be a radio communication mobile terminal. For example, the communication device is a mobile phone, or is a communicating Personal Digital Assistant PDA, or an intelligent telephone like SmartPhone.

In another example, the communication device is connected to a base station of a public wireless network of limited scope, such as WLAN (Wireless Local Area Network) or conforming to a standard 802.1x, or medium range according to the protocol WiMAX (World Wide Interoperability Microwave Access).

In another example, the communication device is a cellular mobile radio communication terminal, connected by a channel to a radio access network through a femto base station.

As fixed terminal, the communication device can be a personal computer connected directly via a modem to link of type xDSL (Digital Subscriber Line) or ISDN (Integrated Services Digital Network Services) connected to the packet network PT, or can be an IP phone using a SIP based protocol or a proprietary protocol.

The communication device CD comprises a unified communication application UCA able to communicate with the telecommunication network TN and in particular with the presence server PS and with another communication device, and implementing protocols and coding/decoding algorithms for different kind of communications.

The unified communication application UCA exploits presence information of a user received from the presence server PS in order to display presence status of such user.

It is assumed that a presence status includes an indication of an availability of an user to receive a communication via a real time interactive communication system. For example, a presence status of "away" refers to an user who is online but is idle for a period of time (e.g. with no mouse or keyboard activities).

It is assumed that a presence information includes a presence status of an user, and may also include descriptions of activities of an user, a timestamp indicating a start time of a period of time during which an user's identity is idle on a device being used in a real time interactive communication system, a type of place in which an user is utilizing the device, and/or a geographic location of the device.

The unified communication application UCA manages data storage that contains a buddy list or a contact list for the user. The unified communication application UCA displays the buddy list that identifies contacts (i.e. other users) with whom the user may communicate via a real time interactive communication system such as instant messaging.

The presence server PS aggregates real-time presence information regarding user availability and delivers the information to users logged in and connected to the presence server.

The presence server PS comprises a client interface INTc for communicating with communication devices and delivers them presence information regarding user availability.

The presence server PS comprises a network interface INTn for communicating with the call server CS. The network interface INTn interrogates the call server CS in order to retrieve call routing rules attributed to a user. The network interface INTn listens to any event corresponding to a change in the call routing rules of a user, the event being provided by the call server CS.

The presence server PS manages a presence service that allows users to publish their presence statuses as well as subscribe to each others' presence statuses. The presence server receives and sends PS the presence status of each user between client devices of each user. The client interface INTc of the presence server manages dynamically a database wherein an identifier IdU of a given user is stored in correspondence with identifiers IdCU of other users that are contacts in the buddy list of said given user.

The call server CS provides a call routing service and handles the routing of calls of users owning several communication devices.

The call server CS comprises an update interface INTu for communicating with the presence server PS and providing call routing rules of a user to the presence server PS.

The call server CS manages a database DB containing call routing rules RR stored in correspondence with identifiers IdCU of users.

For example, the call server takes into account any internal routing (in the system comprising the call server itself), external routing (like third party applications), general settings (for example "All incoming calls are forwarded to Voice Mail"), personal settings ("Only calls from user A are forwarded to Voice Mail"). The call server enables users to choose how incoming calls are to be transmitted, by choice of protocol, network and terminal. The user can be invited to define contexts corresponding to situations in which the user may find himself, such as and "available", "in the office", "at home", etc . . . At a given time, a context is active for each of the users of the call routing service. For example, the activation of a context possibly can be made manually by the user or automatically in relation to personal time schedules for which the activation periods of these contexts have been specified.

In specific exemplary embodiments, the communications between the communication device CD, the presence server PS and the call server CS can be based on protocols such as the protocol XMPP (Extensible Messaging and Presence Protocol) or the SIMPLE protocol (Session initiation protocol for Instant Messaging and Presence Leveraging Extensions).

Figure 2:
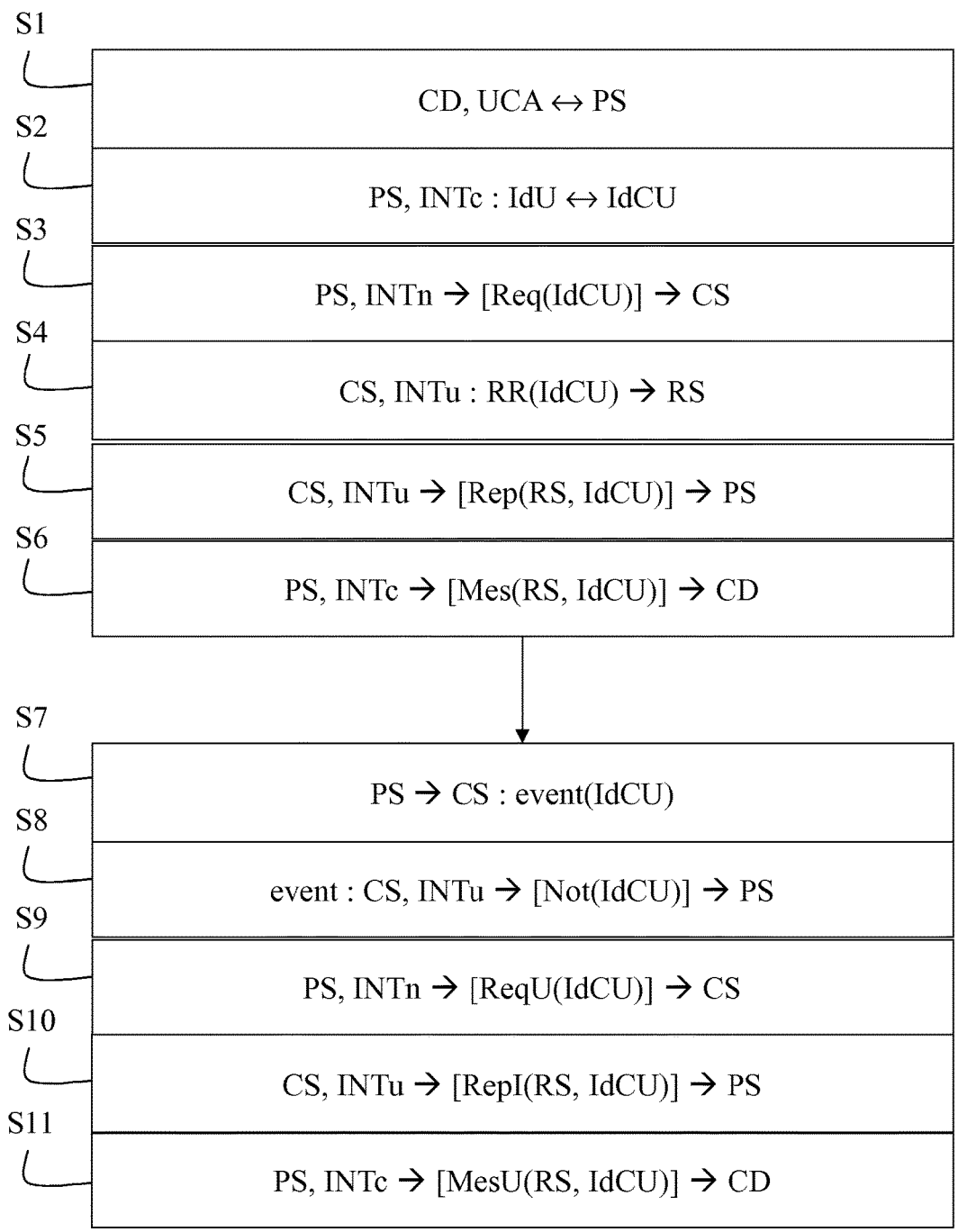
FIG. 2 is a flowchart showing steps performed to execute a method for enriching presence status with call routing status in a telecommunication network according to an embodiment of the invention.

With reference to FIG. 2, a method for enriching presence status according with call routing status to one embodiment of the invention comprises steps S1 to S11 executed automatically within the communication system.

At step S1, the user of the communication device CD launches the unified communication application UCA which establishes connection with the presence server PS and displays a buddy list designating other users that are contacts of the user. The presence server PS identifies the authorized user of the application UCA, for example by means of an authentication with login and password, and retrieves an identifier IdU of the user.

For sake of clarity hereinafter, the user of the application UCA is called application user, and users in the buddy list of the application user are called contact users.

At step S2, the client interface INTc of the presence server PS determines a set of contact users associated with the application user, i.e. a set of users that are in the buddy list of the user in the unified communication application. To this end, the presence server PS determines the identifier IdCU of each contact user associated with the identifier IdU of the application user.

At step S3, the presence server PS interrogates the call server for retrieving call routing rules associated with the set of contact users.

The network interface INTn of the presence server PS sends a request Req to the call server CS, the request containing the identifiers IdCU of the contact users.

At step S4, the update interface INTu of the call server CS determines the call routing rules RR stored respectively in correspondence with the identifiers IdCU in the database DB.

The update interface INTu interprets the call routing rules RR of each contact user in order to create a routing status RS for each contact user.

At step S5, the update interface INTu of the call server CS sends a response Rep to the presence server PS, the response containing the routing statuses RS of the contact users, associated respectively with the identifiers IdCU of the contact users.

At step S6, the client interface INTc of the presence server PS sends a message Mes to the communication device CD, the message containing routing statuses RS of the contact users, associated respectively with the identifiers IdCU of the contact users. The message may also contain presence statuses of contact users combined with routing statuses of contact users.

The unified communication application UCA displays the routing statuses RS of the contact users in the buddy list.

At step S7, the presence server PS subscribes to events that are to be provided by the call server CS and that are associated with the identifiers IdCU of the contact users.

The subscribed events relate to any change in the call routing rules RR of contact users. The purpose of these events is to alert and update the presence server PS of any change in the call routing rules RR of contact users At step S8, when an event related to a change in the call routing rules RR of a given contact user occurs, the update interface INTu of the call server CS sends a notification Not to the presence server PS, the notification containing at least the identifier IdCU of said contact user.

At step S9, the network interface INTn of the presence server PS sends an update request ReqU to the call server CS, the update request containing the identifier IdCU of the contact user.

In a variant, the event is associated with an event identifier IdE, and said event identifier is included in the messages exchanged during steps S8 and S9 instead of the identifier IdCU of the contact user.

At step S10, the update interface INTu of the call server CS interprets the change in the call routing rules RR of the contact user and creates a new routing status RS for said contact user. The update interface INTu of the call server CS sends an update response RepU to the presence server PS, the update response containing the routing status RS of the contact user associated with the identifier IdCU of the contact user.

At step S11, the presence server PS sends an update message MesU to the communication device CD, the update message containing routing status RS of the contact user associated with the identifier IdCU of the contact user. The unified communication application UCA displays the routing status RS of the contact users in the buddy list.

Figure 3:
FIG. 3 is an example of an application displaying presence status enriched with call routing status according to an embodiment of the invention.

FIG. 3 represents an Unified Communication application (UC application) which displays the telephonic presence of buddies, i.e. the presence status enriched with call routing status of buddies. For example, Alice is at home and free on mobile phone, Bob is at work and free on desk phone, and Carol is not logged in the system and is not available. The application can be configured to display color icons meaning different telephonic statuses.

The following section illustrates an example of an unified communication application running on a communication device of a user which is a buddy of Alice, Bob and Carol and can see presence status of all these three users.

The presence server and the call server may be considered as forming part of a unified communication system and the method described with reference to FIG. 2 may be assimilated to a call emulation executed be the unified communication system.

Let's consider a part of working day of three users: Alice, Bob and Carol.

8:00—Alice is at home. All her business calls are routed to her mobile phone. All her buddies see in their Unified Communications application the telephonic status of Alice: "Free on mobile phone". Bob is already at work, all his buddies see in their Unified Communications application the telephonic status of Bob: "Free on desk phone". Carol is at home and she is not logged in Unified Communications application so all her buddies see her status as "Not available". On FIG. 3 the Unified Communications application of said user is shown.

9:00—Alice arrives at work and changes her routing settings in order to have incoming calls on her fixed desk phone. Buddies of Alice are notified about changes in her call routing rules. Then Unified Communications system emulates the calls from buddies to Alice and uses the result to present the telephonic status of Alice ("Free on desk phone") to her buddies.

9:30—Alice needs to participate in a meeting. She configures her call routing rules in order to forward all incoming calls to Voice Mail. The buddies are notified again, calls from them are emulated again and the new status is presented to them: "Calls are forwarded to Voice Mail".

10:00—Carol, who is a buddy of Alice, arrives to work and wants to discuss something with Alice. Carol logins to Unified Communications system. The system emulates calls from Carol to all her buddies and presents the results of the calls, including the result of the emulation of the call from Carol to Alice ("Calls are forwarded to Voice Mail"). Carol decides to wait until Alice is accessible on her phone in order to talk to Alice directly.

The invention described here relates to a method and a server for enriching presence status with call routing status. In an embodiment, the steps of the method of the invention are determined by the instructions of a computer program incorporated in a server such as the presence server PS according to the invention. The program includes program instructions which, when said program is executed in a processor of the data processing device the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for enriching presence statuses of contacts in a contact list with call routing rules associated with said contacts, the presence statuses indicating an availability of said contacts for communication and being delivered by a presence server to an application implemented in a communication device owned by a user, said method comprising the following steps carried out by the presence server:
   sending a request to a call server managing call routing rules of said contacts, the request containing identifiers of said contact, wherein said call server provides a call routing service that takes into account one or more of internal routing, external routing, general and personal settings,
   receiving a response from the call server, the response containing routing statuses of said contacts, the call server having determined call routing rules stored respectively in correspondence with the identifiers and having interpreted the call routing rules to create a routing status for each contact user, and
   sending a message to the communication device, the message containing the routing status for each contact, in order that the application displays the routing status of each contact.

2. The method according to claim 1, further comprising:
   subscribing to events that are to be provided by the call server and that are associated with the identifiers of the contacts,
   when an event related to a change in the call routing rules of at least one contact occurs, receiving a notification from the call server,
   sending an update request related to said event to the call server,
   receiving an update response from the call server, the update response containing the routing status of the contact associated with the identifier of the contact, and
   sending an update message to the communication device, the update message containing the routing statuses of the contact associated with the identifier of the contact.

3. The method according to claim 2, wherein the notification and the update request contain the identifier of said contact.

4. The method according to claim 2, wherein the notification and the update request contain an identifier of said event.

5. A presence server for enriching presence statuses of contacts in a contact list with call routing rules associated with said contacts, the presence statuses indicating an availability of said contacts for communication and being delivered by the presence server to an application implemented in a communication device owned by a user, the presence server comprising:
   an interface for sending a request to a call server managing call routing rules of said contacts, the request containing identifiers of said contacts, wherein said call server provides a call routing service that takes into account one or more of internal routing, external routing, general and personal settings,
   an interface for receiving a response from the call server, the response containing routing statuses of said contacts, the call server having determined call routing rules stored respectively in correspondence with the identifiers and having interpreted the call routing rules to create a routing status for each contact, and
   an interface for sending a message to the communication device, the message containing the routing status for each contact, in order that the application displays the routing status of each contact.

6. A computer program adapted to be executed in a presence server for enriching presence statuses of contacts in a contact list with call routing rules associated with said contacts, the presence statuses indicating an availability of said contacts for communication and being delivered by a presence server to an application implemented in a communication device owned by a user, said program including instructions which, when said program is executed in said presence server, the following steps are carried out:
   sending a request to a call server managing call routing rules of said contacts, the request containing identifiers of said contacts, wherein said call server provides a call routing service that takes into account one or more of internal routing, external routing, general and personal settings,
   receiving a response from the call server, the response containing routing statuses of said contacts, the call server having determined call routing rules stored respectively in correspondence with the identifiers and having interpreted the call routing rules to create a routing status for each contact, and
   sending a message to the communication device, the message containing the routing status for each contact, in order that the application displays the routing status of each contact.

* * * * *